Patented Oct. 19, 1926.

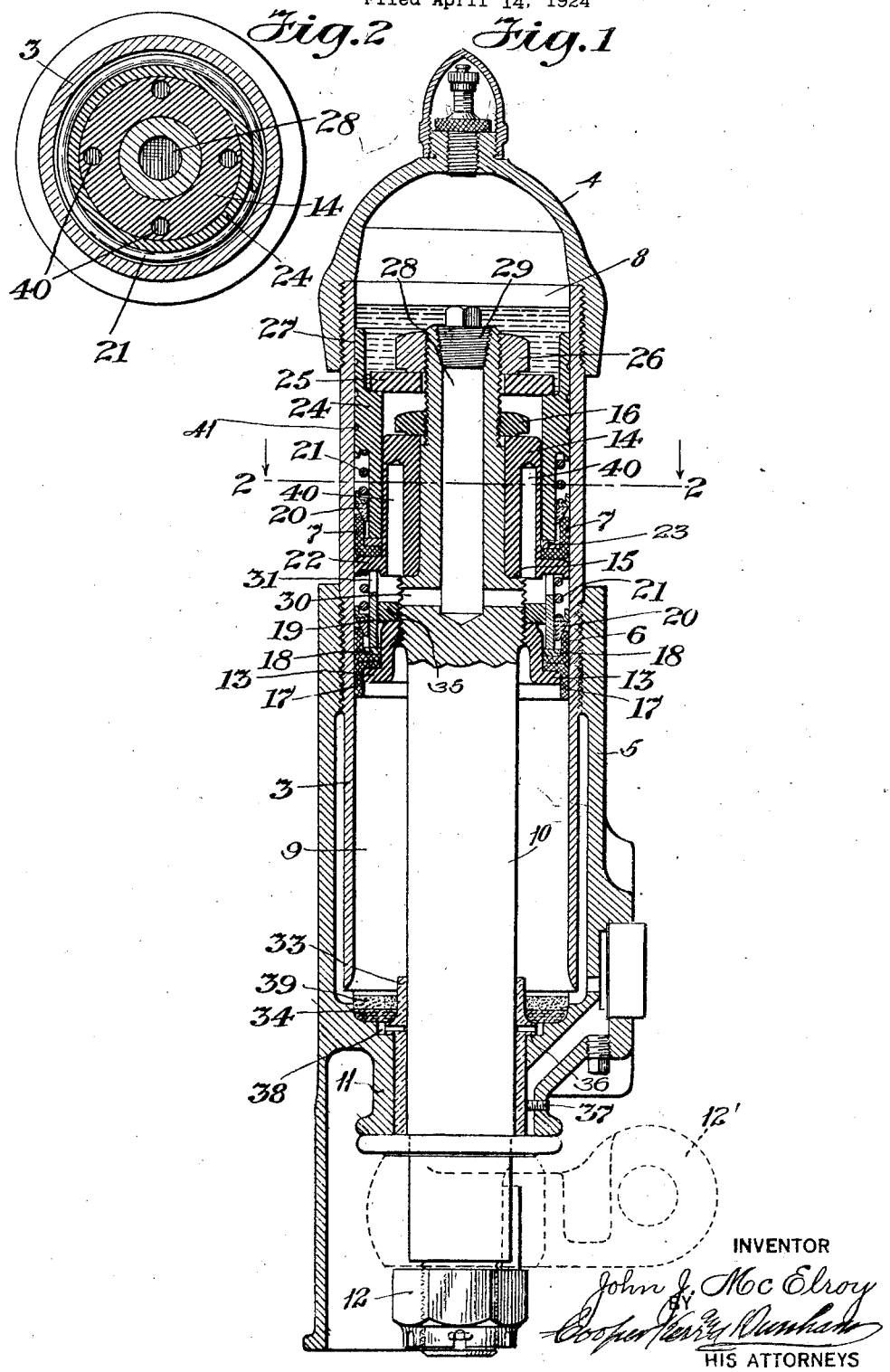

1,603,919

UNITED STATES PATENT OFFICE.

JOHN J. McELROY, OF NEW HAVEN, CONNECTICUT, ASSIGNOR TO THE WESTINGHOUSE AIR SPRING COMPANY, OF NEW HAVEN, CONNECTICUT, A CORPORATION OF PENNSYLVANIA.

AIR SPRING DEVICE.

Application filed April 14, 1924. Serial No. 706,300.

This invention relates to pneumatic cushion devices and method of operating the same, useful in the arts generally, and particularly in connection with vehicles and the like.

One object of the present invention is to provide a device comprising essentially a cylinder with a closed top divided by a piston having a sliding fit therein; the space above the piston being the main cushion chamber containing air usually under pressure and a suitable quantity of oil to serve as an oil seal for preventing air leakage; and the space below the piston containing atmospheric air admitted thereinto through the leaky mechanical seal or packing between the piston rod and the bottom wall of the cylinder, the chamber thus provided at the lower end of the cylinder serving to gradually check the recoil or rebound of the piston.

Another object is the provision in such a structure of means for collecting oil leaking past the seal and restoring it to the chamber above the seal at appropriate periods in the operation of the device.

Another object is the provision of means in the collecting chamber for positively causing the return of the stored oil to the cushion chamber, said last named means being brought into operation at appropriate times by and during the operation of the spring members, whereby the life of the spring is prolonged indefinitely.
Another object is the provision of means in said device for confining the atmospheric air to the lower chamber, thus preventing or restraining the passage thereof into the collecting chamber or the cushion chamber.
Other objects and features of novelty are pointed out hereinafter and in the appended claims.

In the drawing forming part of this application, Fig. 1 is a vertical elevational view in midsection of one form of pneumatic spring embodying my invention, and Fig. 2 is a transverse sectional view taken along the line 2—2 of Fig. 1.
The device consists of a suitable length of tubing 3, to the upper end of which a dome shaped head 4 is threaded, and to the lower end of which a cup-shaped casting 5 is threaded.

A piston or plunger carrying two annular cup-shaped packings 6 and 7 is arranged to slide within tubing 3 and divides the interior of the air spring into a variable volume load supporting cushion chamber 8 and a rebound or recoil check chamber 9.

A piston rod 10 carries the piston or plunger and projects through the bottom 11 of the air spring and is connected by nut 12 to the clevis 12' outer end of a leaf spring of a vehicle, while cup-shaped member 5 is suitably connected to a front horn or a leaf spring attached to the vehicle frame, as is now well understood in the art.

The piston of the air spring preferably consists of a lower annular nut or base 13 threaded onto the piston rod 10 and an upper annular follower 14 mounted on the upper end of the piston rod 10 and held in place against a shoulder 15 thereon by a threaded nut 16.

These two nuts 13 and 14 form supports for the cup packings 6 and 7 and their outer peripheries are preferably finished so as to form bearing surfaces adapted to slide on the inner surfaces of cylinder 3. In the event it is desired to utilize a cup shaped packing 17 facing into the chamber 9 to insure that no air leaks past the cup packing 6 from said chamber, the outer periphery of the nut 13 will be cut away a sufficient distance to permit the interposition of the cup shaped packing 17 between said nut and the wall of cylinder 3. Packing 6, or packings 6 and 17, as the case may be, are held in place on nut 13 by means of an annular washer 18 and a tubular retainer 19 which is held in place by cylindrical follower 14. The free edge of each of the cup shaped packings 6 and 7 is pressed against the inner wall of cylinder 3 by means of cone expanders 20, and helical springs 21. Cup shaped packing 7 is held in place on annular flange 22 of annular nut 14 by means of an annular washer 23 and follower 24 which, in turn, is held in place by washer 25 and nut 26 at the top of piston rod 10. The nut or follower 24 is formed with a relatively long cylindrical bearing surface 27 in which are formed the spaced-apart annular channels 41.

Piston rod 10 to a point midway between the cup packings 6 and 7 is drilled from the top thereof to form an air chamber 28 and a threaded plug 29 is provided at the top and hermetically closes off the chamber 28 at this point. The annular nut 14 is also drilled from its lower face upwardly to within a distance of its top surface to form a plurality of chambers 40 for the same purpose as hole 28 which purpose will hereinafter be fully described. Oil ducts 30, 30, extend from the bottom of the chamber 28 and open into the space between the said cup packings 6 and 7. The retainer 19 is provided with a number of oil holes 31, 31, near its upper edge and the space between the cup packings 6 and 7 serves as an oil retaining chamber for maintaining a constant oil seal for the free edge of cup packing 6. The ring 35, threaded to piston rod 10 on fitting inside sleeve 19 with its top edge at the bottom of holes 31, 31, prevents oil from accumulating in a dead pocket between sleeve 19 and nut 13 below said holes 31, 31.

A bushing 33 formed from suitable bearing metal is positioned within the central opening of bottom member 11 and serves as a bearing for the piston rod 10, the shoulder 36 about the middle of the bushing serving to properly position said bushing with respect to the said opening and the set screw 37 through member 11 serving to hold the bushing in position. The annular channel 38 at the bottom of member 11 and about the shoulder 36 and into which connect holes 38 in said bushing 33 serves with said holes as passageway for lubricating oil to flow between said bushing 33 and the piston rod 10, such oil being supplied through an oil cup (not shown) connected to the side of the bottom member 11.

An annular buffer 34 of some suitable material such as felt loosely surrounds sleeve 33 and rests on the bottom of member 11 with the heavy annular ring 39 of soft rubber resting on said buffer 34 and pressing against the sides of member 11 whereby it is held in place. These two members serve to receive any shock between the piston and member 11 due to any excessive rebound conditions.

Normally, the cushion chamber 8 will be filled with oil to approximately the level shown in the drawings, the oil filling the spaces between the cup packings 6 and 7.

The act of filling the chamber 8 with oil preparatory to putting the device into service traps and confines a quantity of air or other elastic fluid in the chamber 28 and I make use of this chambered air or other elastic fluid in the operation of the device to aid and assist in maintaining a liquid seal between the lower extremity of the piston and the rebound chamber 9 and to keep the oil circulating to the bearing surfaces through the space above the cup washer 6.

It will be understood that the device will be initially charged with the required amount of air under pressure through a check valve conventionally shown at 35 and the air pumped will flow into the cushion chamber 8 of the device and be confined there, as is now well understood in the art.

In the operation of the device, with the embodiment of the invention as shown in the drawing, if no oil is forced past the cup washer 7, there will be no change in the level of the oil in chambers 28 and 40 and consequently no increase in the degree of compression of the air therein. On the other hand, should oil leak past, or be forced past, the cup washer 7, it will raise the level of the liquid in the chamber 28 and consequently increase the degree of compression of the air therein, and successive leakages of this character will build up a pressure in the chambers 28 and 40 and consequently place all the oil above the cup washer 6 under increased pressure until the pressure exerted by the air confined in chamber 28 exceeds a minimum pressure in the cushion chamber 8, at which time the excess liquid will be transferred to a point above the cup washer 7. For example, with a pressure in the chamber 8 of, say, 70 to 90 pounds per square inch for normal standing load, the pressure under working conditions varies therein from 150 to 200 pounds per square inch on the up stroke of the piston to 30 to 35 pounds per square inch on the down stroke thereof. From the foregoing, it will be seen that I make use of the pumping action of the air spring to force the oil escaping from the air chamber 8 into another chamber and gradually build up a pressure therein which will exceed a minimum pressure of said chamber 8 and also avail myself of the pumping action of the chamber 8 at the minimum operating pressures below that built up in the auxiliary chambers 28 and 40 to positively draw the excess of oil from the said chambers 28 and 40 back into the chamber 8, at appropriate times during the operation of the device.

Should the cup washer 7, for any reason, break down while the spring is in use, the air chambers 28 and 40 will then take the rapid variations of pressures more or less direct and serve to protect the cup washer 6 from the deleterious effects of such rapid pressure variations and the consequent pumping action exerted on the chambers 28 and 40 by the pressure variations in chamber 8 will continue to serve to circulate the oil above cup washer 6, as the unimpaired portion of the cup washer 7 will continue to act as a seal between the chamber 8 and the space above the cup washer 6, to all bearing parts of the piston, and the device will continue to work efficiently.

The construction above described for returning the escaped oil to the cushion chamber 8 has marked advantages in view of the fact that it has no moving parts to get out of order and, further, the transfer of the oil is automatically accomplished only at those times when oil has accumulated.

Furthermore, it will be apparent that the oil between the long bearing 27 and the wall 3 in cushion chamber 8 is under pressure at all times, and I have discovered that by the employment of this arrangement, the device operates more smoothly and is more steady than similar devices in which such a bearing is absent. I have found also that by providing said bearing surface 27 with spaced annular channels 41 that oil may be entrapped therein whereby is provided that there is at all times between bearing 27 and bearing 3 sufficient oil both to lubricate them and form a seal between the two surfaces.

I claim:

1. In a vehicle spring, a cylinder, a piston closing off a portion of said cylinder for a cushion chamber, two spaced-apart packing rings for the joint between said piston and cylinder, a piston rod connected to and extending through said piston, an axial chamber within said piston rod and a plurality of chambers in said piston extending toward said cushion chamber and opening into a space between said packing rings, oil and air in said cushion chamber, annular grooves in the cylindrical surface of said piston between said cushion chamber and said packing rings, a closed end for said cylinder through which said piston extends and a bushing of bearing metal mounted in said end about said piston rod and extending in both directions from the inside of said end, and openings in said bushing leading from said cylinder to said piston rod for conducting oil thereto.

2. In a vehicle spring, a cylinder, a piston closing off a portion of said cylinder for a cushion chamber, air and oil in said cushion chamber, two spaced-apart packing rings for the joint between the said cylinder and piston, an axial chamber at the center of said piston, and a plurality of chambers about and parallel with said middle chamber, each of said chambers being closed at its top, said chambers extending beyond the packing ring nearest said cushion chamber and connecting at points below their tops with a space between said packing rings.

3. In a vehicle spring, a cylinder, a piston head closing off a portion of said cylinder for a cushion chamber, air and oil in said cushion chamber, and a packing ring for said piston, said piston having formed in its bearing surface between said chamber and ring a shallow annular channel, a chamber in said piston head closed at its top, and passage ways from a point near the bottom of said chamber to the exterior of said piston head at its side.

4. In a vehicle spring, a cylinder, a piston closing off a portion of said cylinder for a cushion chamber, two spaced-apart packing rings for the joint between the said cylinder and piston, an axial chamber at the center of said piston, and a plurality of chambers about and parallel with said middle chamber, each of said chambers being closed at its top, said chambers extending beyond the packing ring nearest said cushion chamber and connecting at points below their tops with a space between said packing rings.

5. In a vehicle spring, a cylinder, a piston head closing off a portion of said clyinder for a cushion chamber, a chamber in said piston closed at its top and passageway from a point below the top of said chamber to the exterior of said piston at its side.

In testimony whereof I hereto affix my signature.

JOHN J. McELROY.